No. 680,004. Patented Aug. 6, 1901.
J. R. SIMMS.
REFRIGERATOR.
(Application filed Apr. 25, 1901.)
(No Model.)
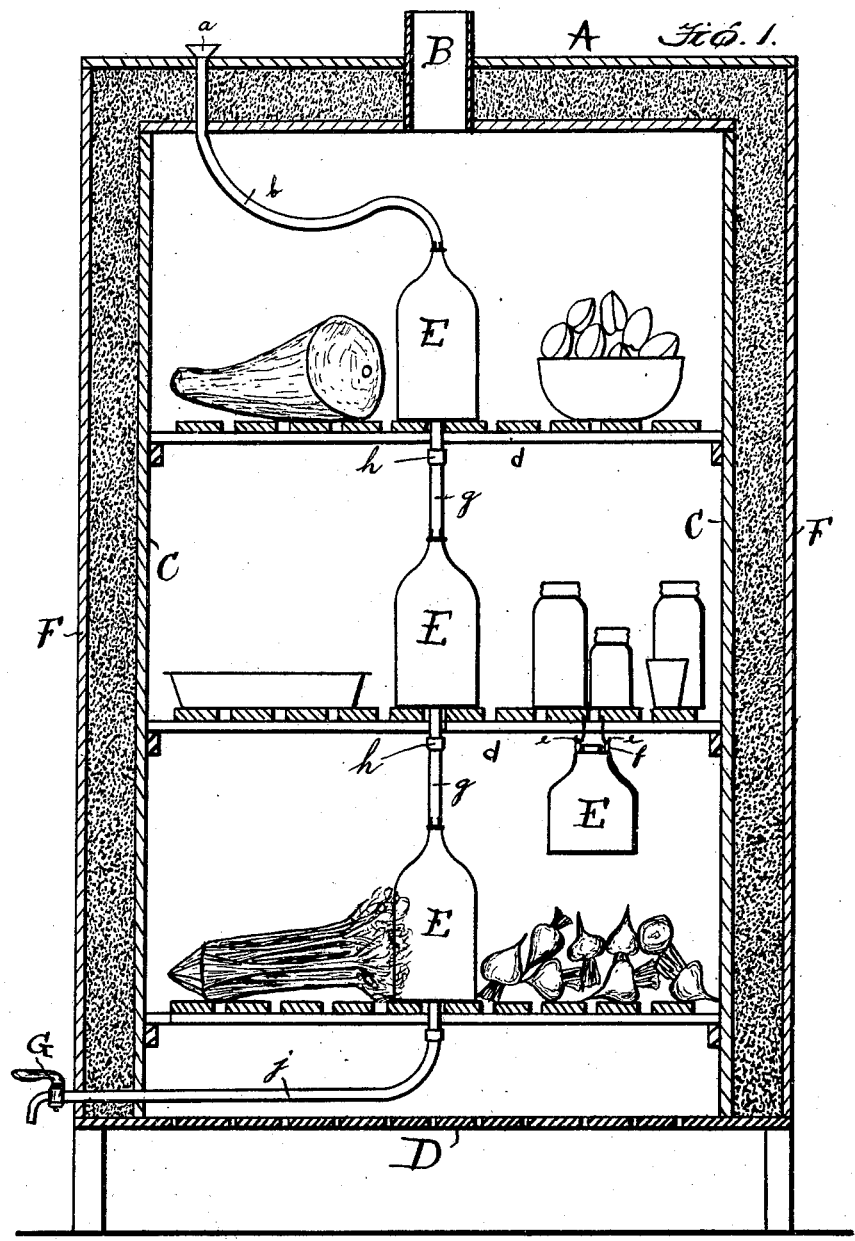
Witnesses
L. B. Hodge
R. T. Henry
Inventor
John R. Simms
By Joshua B. Webster
Attorney

UNITED STATES PATENT OFFICE.

JOHN R. SIMMS, OF LINDEN, CALIFORNIA.

REFRIGERATOR.

SPECIFICATION forming part of Letters Patent No. 680,004, dated August 6, 1901.

Application filed April 25, 1901. Serial No. 57,415. (No model.)

*To all whom it may concern:*

Be it known that I, JOHN R. SIMMS, a citizen of the United States, residing at Linden, in the county of San Joaquin and State of California, have invented a new and useful Refrigerator, of which the following is a specification.

My invention relates to certain new and useful improvements in apartments for the storage of perishable provisions during hot weather, known as "refrigerators," by the use of such devices as are adapted to maintain a proper degree of low temperature without the use of ice; and my object is to furnish a food chamber or chest, in combination with certain cooling devices, which will be cheap of construction and operation. This I accomplish by the use mainly of canvas jugs or any suitable absorbent material filled or saturated with water and placed within the food chamber or chest; and it consists in the peculiar construction, novel combination, and adaptation of parts hereinafter described, and particularly pointed out in the claims hereto annexed, reference being had to the accompanying drawings for a better comprehension thereof, in which—

Figure 1 is a sectional view of my refrigerator-chest, disclosing the interior and its contents. Fig. 2 is a vertical section of one of the cooling devices.

Similar letters of reference indicate corresponding parts in both views of the drawings, referring to which—

A represents the top of the chest, having at its center a ventilator-chimney or air-outlet B. C indicates the doors of the chest, which may be hinged in the usual way. D is the bottom of the chest, provided with numerous perforations or air-inlets. Shelves $d$ are placed in suitable positions within the chest and are slotted. Canvas jugs E are located at the centers of the shelves $d$, such jugs E being previously filled with cold water, or, if preferred, the top jug may be filled through a pipe $b$, supplying water from the top A of the chest, such pipe $b$ being connected therewith at a point containing an orifice or water-bowl $a$, the water flowing through from top jug down through a connecting-pipe $g$ into the series of jugs beneath and from the bottom one of such series into a discharge-pipe $j$, having a faucet G at its outer end outside the chest by means of which the water may be drawn off from the jugs and connecting-pipes when it is desired to flush or cleanse them.

If preferred, for cheapness and simplicity the pipes $b$, $g$, and $j$ may be dispensed with and the jugs E used without them, in which event such jugs E will be supplied with loop-handles $f$, by which they are suspended from hooks $e$, attached beneath the shelves $d$. The ends of the pipes $b$ and $g$ which enter the jugs are of sufficient density to permit of them being tightly inserted in the outlets and inlets, respectively, of the jugs E, so as to prevent any outflow of water, and the sections $g$ are provided with couplings $h$, so that they may be easily connected and disconnected when it is desired to remove the jugs. The air is admitted, as heretofore shown, through the perforated bottom D, and passing upward encounters the moist surfaces of the jugs E, causing evaporation, and thus reducing the temperature, and then escapes through the ventilator-chimney B.

Water may be cooled for drinking purposes by placing a filled earthen jug within the chest and suspending it by the loops $f$ from the hooks $e$ beneath the shelves $d$.

I have chosen canvas jugs filled with water as best illustrating my direct means of cooling the air; but any other absorbent material of the same nature, it is apparent, may be utilized—to wit, saturated with water and suspended within the chest.

My invention in remote districts, where artificial refrigeration by means of ice is impracticable, will be found of very great advantage by reason of its simplicity and cheapness.

If it is desired to use my invention on a large scale—for instance, for refrigerating a meat-storage chamber—the same methods substantially as shown herein are employed, in which case the perforations herein shown in the bottom D of the chest may be located at the sides of the base of the chamber.

I am aware that refrigerators have been constructed in which the air is cooled by the evaporation of water held in porous material, and this feature I do not claim, broadly; but

What I claim as new, and desire to secure by Letters Patent, is—

1. In a refrigerator the combination substantially as described and shown of the chest, ventilator-chimney B at the top A, the bottom D provided with air-inlets, the slotted shelves d, and canvas water-jugs E suspended beneath the shelves d.

2. In a refrigerator the combination with a suitable chest provided with a door C, and shelves d, provided with slots, of the ventilator-chimney B on the top A, provided with water-inlet a, air-inlets at the bottoms or sides of the base, the jugs E, and means for filling the jugs E with water consisting of the pipe b secured to the top A at the inlet a, and the connecting-pipes g, all constructed and operating substantially as described and shown.

3. In a refrigerator the combination of a chest, a ventilator-chimney at the top, a bottom provided with air-inlets, a series of canvas water-jugs within the chamber and means for supplying the jugs with water and flushing the same composed of the water-inlet a, a supply-pipe b, connecting-pipes g, supplied with couplings h, and the discharge-pipe j, provided with the faucet G, all arranged and operating substantially as described and shown.

In testimony whereof I affix my signature in presence of two witnesses.

JOHN R. SIMMS.

Witnesses:
JOSHUA B. WEBSTER,
L. B. HODGE.